(12) United States Patent
Sahlin et al.

(10) Patent No.: US 12,395,972 B2
(45) Date of Patent: *Aug. 19, 2025

(54) SHORT TTI PATTERNS

(71) Applicant: Telefonaktiebolaget LM Ericsson (publ), Stockholm (SE)

(72) Inventors: Henrik Sahlin, Mölnlycke (SE); Niklas Andgart, Södra Sandby (SE); Laetitia Falconetti, Järfälla (SE); Daniel Larsson, Lund (SE); Jingya Li, Gothenburg (SE); Gustav Wikström, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 215 days.

This patent is subject to a terminal disclaimer.

(21) Appl. No.: 18/340,224

(22) Filed: Jun. 23, 2023

(65) Prior Publication Data

US 2023/0337199 A1    Oct. 19, 2023

Related U.S. Application Data

(63) Continuation of application No. 17/488,574, filed on Sep. 29, 2021, now Pat. No. 11,729,752, which is a
(Continued)

(51) Int. Cl.
| | |
|---|---|
| *H04W 72/0446* | (2023.01) |
| *H04L 1/16* | (2023.01) |
| *H04L 1/1812* | (2023.01) |
| *H04L 1/1867* | (2023.01) |
| *H04L 5/00* | (2006.01) |
| *H04W 72/23* | (2023.01) |

(52) U.S. Cl.
CPC ........... *H04W 72/0446* (2013.01); *H04L 1/16* (2013.01); *H04L 1/1812* (2013.01); *H04L 5/003* (2013.01); *H04W 72/23* (2023.01); *H04L 1/1887* (2013.01); *H04L 1/1896* (2013.01); *H04L 5/005* (2013.01); *H04L 5/0051* (2013.01); *H04L 5/0057* (2013.01)

(58) Field of Classification Search
None
See application file for complete search history.

(56) References Cited

U.S. PATENT DOCUMENTS

| | | |
|---|---|---|
| 10,064,165 B2 | 8/2018 | Xu et al. |
| 2016/0143008 A1 | 5/2016 | Lee et al. |
| (Continued) | | |

FOREIGN PATENT DOCUMENTS

| | | |
|---|---|---|
| CN | 103518413 A1 | 1/2014 |

OTHER PUBLICATIONS

Official Action issued by the Chinese Patent Office for Application No. 201780049152.2—Oct. 8, 2022.
(Continued)

*Primary Examiner* — Walter J Divito
(74) *Attorney, Agent, or Firm* — Baker Botts L.L.P.

(57) ABSTRACT

There is disclosed a method of operating a terminal (10) in a wireless communication network, the method comprising receiving and/or transmitting according to a transmission time interval, TTI, configuration, the TTI configuration indicating at least one short transmitting time interval having between one or two and seven symbols of duration in a subframe.
There are also disclosed related methods and devices.

14 Claims, 9 Drawing Sheets

Related U.S. Application Data continuation of application No. 16/324,668, filed as application No. PCT/SE2017/050820 on Aug. 14, 2017, now Pat. No. 11,140,678.

(60) Provisional application No. 62/374,269, filed on Aug. 12, 2016.

(56) References Cited

U.S. PATENT DOCUMENTS

| | | |
|---|---|---|
| 2016/0143030 A1 | 5/2016 | Lee et al. |
| 2016/0219583 A1 | 7/2016 | Blankenship |
| 2017/0290008 A1 | 10/2017 | Tooher et al. |
| 2018/0048440 A1 | 2/2018 | Yang et al. |
| 2018/0167933 A1 | 6/2018 | Yin et al. |
| 2018/0176043 A1 | 6/2018 | Kim et al. |
| 2018/0206232 A1 | 7/2018 | Takeda et al. |
| 2018/0227907 A1 | 8/2018 | Hosseini et al. |
| 2019/0037585 A1 | 1/2019 | Li et al. |
| 2019/0082457 A1 | 3/2019 | Zhou et al. |
| 2019/0150171 A1 | 5/2019 | Hwang et al. |
| 2019/0165894 A1 | 5/2019 | Choi et al. |
| 2019/0174492 A1 | 6/2019 | Gao et al. |
| 2019/0182810 A1 | 6/2019 | Gao et al. |
| 2019/0190763 A1 | 6/2019 | Takeda et al. |
| 2019/0223204 A1 | 7/2019 | Kim et al. |

OTHER PUBLICATIONS

3GPP TSG-RAN WG1 #85; Nanjing, P.R. China; Source: Ericsson; Title: On the operation with different TTI lengths (R1-165299)—May 23-27, 2016.

PCT International Search Report for International application No. PCT/SE2017/050820—Oct. 16, 2017.

PCT Written Opinion of the International Searching Authority for International application No. PCT/SE2017/050820—Oct. 16, 2017.

Notice of Allowance and Fee{S) Due issued by the USPTO for U.S. Appl. No. 16/367,717—Jan. 10, 2020.

3GPP TSG RAN WG1 Meeting #84bis; Busan, Korea; Source: ZTE; Title: Downlink control channels for shortened TTI (R1-162405)—Apr. 11-15, 2016.

Extended European Search Report issued for Application No./ Patent No. 17839928.3-1205 / 3498015 PCT/SE2017050820—Feb. 19, 2020.

3GPP TSG-RAN WG1 #85; Nanjing, P.R. China; Source: Ericsson; Title: Physical design aspects of sPUSCH (R1-165296)—May 23-27, 2016.

Communication Pursuant to Article 94(3) EPC issued for Application No. 17 839 928.3-1205—Mar. 30, 2021.

3GPP TSG-RAN WG1 #85; Nanjing, P.R, China; Source: Ericsson; Title: On the operation with different TT1 lengths (R 1-165299)—May 23-27, 2016 (Year: 2016).

3os DL TTI

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1os PDCCH | R | | | | | | | | | | | | | |
| sTTI | | | | R | C | C | R | C | C | R | C | C | | |
| | | 0 | | | 1 | | | 2 | | | 3 | | | |
| 2os PDCCH | R | | | | | | | | | | | | | |
| sTTI | | | R | C | C | R | C | C | R | C | C | | | |
| | 0 | | | 1 | | | 2 | | | 3 | | | | |
| 3os PDCCH | R | | | | | | | | | | | | | |
| sTTI | | | R | C | C | R | C | C | R | C | C | | | |
| | 0 | | | 1 | | | 2 | | | 3 | | | | |

6os DL TTI

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1os PDCCH | R | | | | | | | | | | | | | |
| sTTI | | | | R | C | C | R | C | C | R | C | C | | |
| | | 0 | | | | | | 1 | | | | | | |
| 2os PDCCH | R | | | | | | | | | | | | | |
| sTTI | | | R | C | C | R | C | C | R | C | C | | | |
| | 0 | | | | | | 1 | | | | | | | |
| 3os PDCCH | R | | | | | | | | | | | | | |
| sTTI | | | R | C | C | R | C | C | R | C | C | | | |
| | 0 | | | | | | 1 | | | | | | | |

SHORT TTI PATTERNS

PRIORITY

This application is a continuation, under 35 U.S.C. § 120, of U.S. patent application Ser. No. 17/488,574 filed on Sep. 29, 2021 which is a continuation, under 35 U.S.C. § 120, of U.S. patent application Ser. No. 16/324,668 filed on Feb. 11, 2019, which is a U.S. National Stage Filing under 35 U.S.C. § 371 of International Patent Application Serial No. PCT/SE2017/050820 filed Aug. 14, 2017 and entitled "SHORT TTI PATTERNS" which claims priority to U.S. Provisional Patent Application No. 62/374,269 filed Aug. 12, 2016 each of which is hereby incorporated by reference in its entirety.

TECHNICAL FIELD

This disclosure pertains to wireless communication technology, in particular in the context of short transmission time intervals.

BACKGROUND

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Shorter latency than previous generations of 3GPP RATs was one performance metric that guided the design of Long Term Evolution (LTE). LTE is also now recognized by the end-users to be a system that provides faster access to internet and lower data latencies than previous generations of mobile radio technologies.

Packet data latency is important not only for the perceived responsiveness of the system; it is also a parameter that indirectly influences the throughput of the system.

HTTP/TCP is the dominating application and transport layer protocol suite used on the internet today. According to HTTP Archive (http://httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start, the performance is latency limited. Hence, improved latency can rather easily be shown to improve the average throughput, for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources, potentially improving the capacity of the system.

SUMMARY

It is an object of this disclosure to provide approaches allowing improved latency.

One possible area to address when it comes to packet latency reductions, is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix.

Accordingly, there is proposed a method of operating a terminal in a wireless communication network. The method comprising receiving and/or transmitting according to a transmission time interval, TTI, configuration. The TTI configuration indicates at least one short transmitting time interval having between one or two and seven symbols of duration in a subframe.

A terminal for a wireless communication network may be considered. The terminal is adapted for receiving and/or transmitting according to a transmission time interval, TTI, configuration. The TTI configuration indicates at least one short transmitting time interval having between one or two and seven symbols of duration in a subframe. The terminal may comprise, and/or be adapted for utilising, processing circuitry (respectively control circuitry), and/or radio circuitry, in particular a receiver and/or transmitter and/or transceiver, for the receiving and/or transmitting, and/or for receiving the TTI configuration. Alternatively, or additionally, it may comprise a corresponding receiving module and/or transmitting module.

The TTI configuration may configured by a network node.

In addition, a method of operating a network node in a wireless communication network is considered. The network node is adapted for configuring a terminal with a transmission time interval, TTI, configuration for downlink communication and/or uplink transmission. The TTI configuration indicates at least one short transmitting time interval having between one or two and seven symbols of duration in a subframe.

Also, a network node for a wireless communication network is described. The network node is adapted for configuring a terminal with a transmission time interval, TTI, configuration for downlink communication and/or uplink transmission. The TTI configuration indicates at least one short transmitting time interval having between one or two and seven symbols of duration in a subframe. The network node may comprise, and/or be adapted for utilising, processing circuitry (respectively control circuitry), and/or radio circuitry, in particular a transmitter and/or transceiver, for the configuring. Alternatively, or additionally, it may comprise a corresponding configuring module.

The short transmission time interval in general may be limited to, and/or arranged in, and/or comprised in, and/or confined to, one slot of the subframe, e.g. the first or second slot, and/or may be arranged to not cross from one slot to the next.

There is also considered a program product comprising code executable by processing circuitry and/or control circuitry, the code causing the processing circuitry and/or control circuitry to carry out and/or control a method as described herein.

A carrier medium carrying and/or storing a program product as described herein is also described.

The approaches described herein allow low-latency application already at the TTI level, facilitating easy configuration with little additional overhead. The TTI configuration may in particular additionally indicate or schedule or configure reference signaling, e.g. CRS and/or CSI-RS signaling, e.g. in the subframe. A TTI configuration may be configured for a subframe with controls signaling, e.g. DCI and/or PDCCH signaling in the same subframe, e.g. in a control region at the beginning of the subframe.

BRIEF DESCRIPTION OF THE DRAWINGS

The drawings are provided to illustrate concepts and approaches described herein, and are not intended to limit their scope. The drawings comprise:

FIG. 2, showing additional exemplary TTI configurations;
FIG. 3, showing additional exemplary TTI configurations;
FIG. 4, showing additional exemplary TTI configurations;
FIG. 7, showing additional exemplary TTI configurations;
FIG. 9, showing additional exemplary TTI configurations.

DETAILED DESCRIPTION

Figure 1:
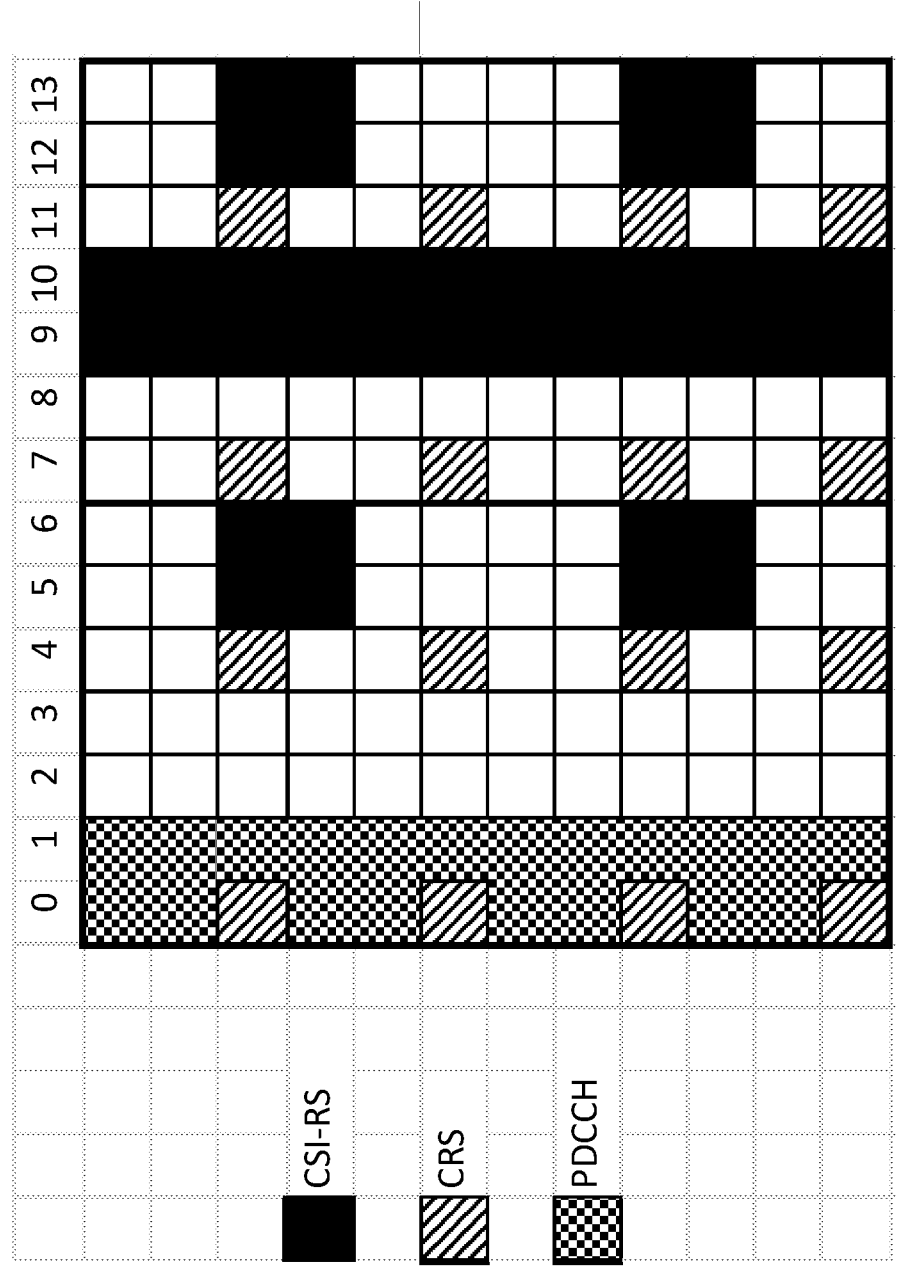
FIG. 1, showing an exemplary TTI configuration.

Short(er) TTIs can be decided to have any duration in time and comprise resources on a number of OFDM or SC-FDMA symbols within a 1 ms SF. As one example, the duration of the short TTI may be 0.5 ms, i.e. seven OFDM or SC-FDMA symbols for the case with normal cyclic prefix. As another example, the duration of the short TTI may be 2 symbols. It may be considered that a sTTI has a duration between one, preferably 2, and 7 symbols. A TTI pattern may be adapted accordingly to cover the sTTI duration. A LTE subframe comprises two slots, each of 0.5 ms duration. Usually, symbols 0 to 6 are associated to the first slot (slot 0), and symbols 7 to 13 to the second slot (slot 1).

CSI-RS is an example of reference signaling. The Channel State Information Reference Signal (CSI-RS) is a cell specific signal spanning two consecutive symbols in downlink, as shown in FIG. 1. There are 20 different CSI-RS positions possible in a subframe. A cell may for example be configured with one, two, four, or eight CSI-RS according to predefined patterns. In the case of one CSI-RS, the pattern for two CSI-RS may be used. The slot border between slot 0 and slot 1 is marked with a broadened line between symbols 6 and 7.

CSI-RS is used by the network (e.g. in cooperation with a terminal performing a CSI procedure) to acquire channel state information and to estimate the interference. CSI-RS can be of zero power (muted), which makes it possible for a UE to measure on another cell than its serving cell, and also to measure on configured CSI-IM (Interference Measurement) resources, defined as a zero-power CSI-RS resource intended for interference measurement.

DL (Downlink) patterns for short TTI operations may not be not confined to the slot, such that legacy LTE CSI-RS pattern may end up in multiple short TTI. If a CSI-IM measurement is performed in a neighboring cell and the two symbols correspond to two different short TTI transmissions with different characteristics, the measurement quality may be impacted.

There are presented DL short TTI patterns that contain whole CSI-RS, which may be aligned at a symbol index or border, allowing a broad range of, or a change of TTI lengths. The TTI patterns may be defined such that they do not cross a slot border within a subframe, and/or may be in one version, limited to the first slot of a subframe (slot 0). The patterns for TTI may be multiplexed in time and/or over several channels, as described herein. Alternatively, or additionally, one or more patterns may be time-aligned at a specific symbol or a symbol border, which may be represented by the associated symbol index. For example, the symbol aligned to may be the first symbol of the next slot, respectively the leading (in time) border of this symbol, which may be considered to correspond to the trailing (in time) border of the last symbol of the current slot.

The proposed solution supports in particular downlink short TTI transmissions while maintaining the quality of CSI-RS measurements which are an important part of channel and interference estimation.

By confining the short TTIs within a slot, the short TTI length can be changed (switching between patterns) at the slot border and/or between subframes. There also exists a frequency-hopping resource allocation scheme (resource allocation of type 2 with virtual resource blocks) where frequency allocation can change between the slots.

New patterns for short TTI transmission in DL may be defined based on one or more of the following conditions:
  The short TTIs are defined as part of the PDSCH in the DL subframe; and/or
  The short TTIs are aligned at a symbol with a given index (e.g. 7), in particular a border thereof, for example the border leading in time (e.g. they do not cross the slot border=alignment at symbol index 7); and/or
  The CSI-RS/IM pairs are contained in one short TTI; and/or
  The short TTIs should be of the designated length (e.g. 2 or 7 symbols) when possible.

Figure 2:
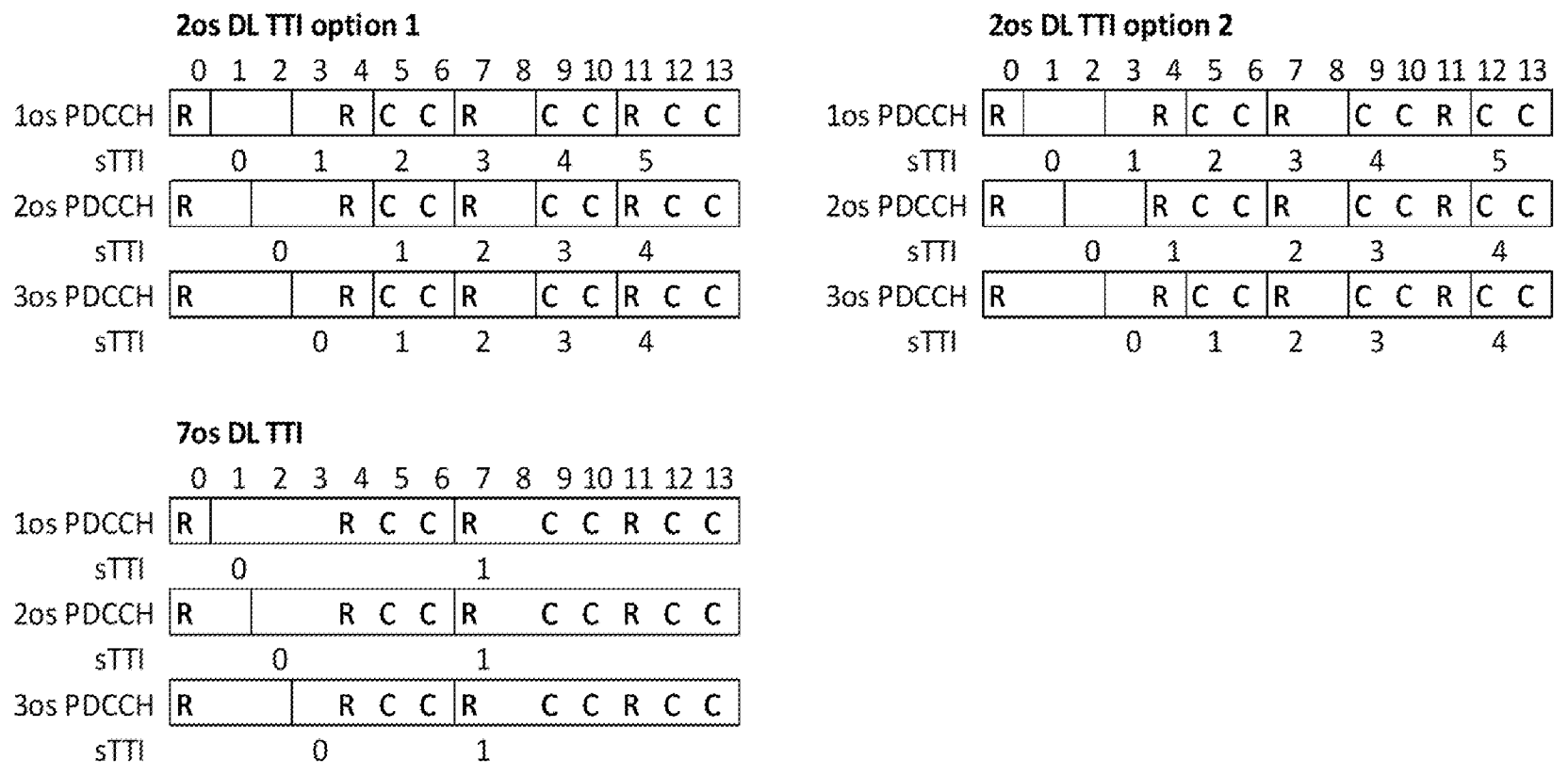

The above conditions taken together may lead to patterns exemplarily shown in FIG. 2.

Generally, a TTI pattern (sTTI pattern) may be represented by and/or associated to a TTI duration or length, and/or may be defined or arranged in a subframe structure.

As seen in the figure, for the 2 symbol TTI case, some TTIs are forced or extended to a length of 3 symbols. This can be done in several ways, and two options are shown in the figure.

Figure 3:
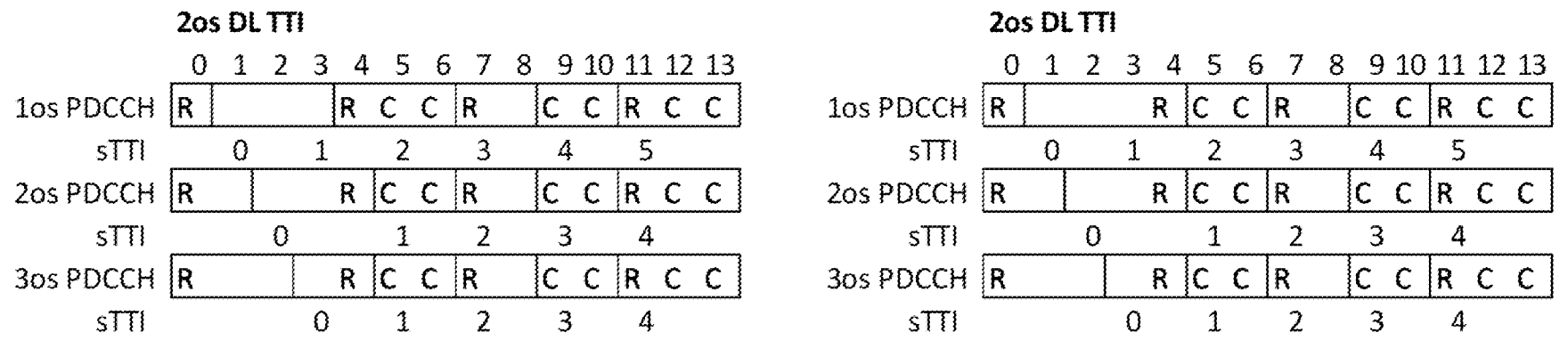

FIG. 3 shows two cases where the split is changed for 1 os (OFDM symbol length) PDCCH. This is done to keep the number of TTIs the same (always five), independent on number of used PDCCH symbols.

As an embodiment, the position of the longer TTIs in the 2 symbol case are chosen so that they contain multiple UL DCI (Downlink Control Information) as required by the UL short TTI scheduling. This may happen in the case of 6 or 8 UL short TTI per subframe and only 5 DL short TTI per subframe, thus requiring more than one UL short TTI to be scheduled from one DL short TTI. The flexibility in the DL pattern can then be used to place the longer TTIs where the extra UL DCI messages are required. This may depends on the UL timing.

Another way to allow for time-multiplexing of sTTIs with different lengths is to have a sTTI ending at the same OFDM symbol for all different configurations. This symbol does not necessarily need to be the last symbol of the first slot of a subframe. This would not allow the frequency-hopping allocation, but may have the advantage of more equal TTI lengths. An example of this is shown in FIG. 4 with 3 symbol and 6 symbol TTI length.

Generally, to each subframe or slot, there may be associated one or more TTI patterns and/or TTI lengths, such that one or more TTI patterns may be included in one slot or a subframe. A TTI pattern may pertain to downlink and/or uplink transmissions. In a subframe, there may be arranged or allocated TTI patterns comprising or scheduling downlink transmissions, uplink transmission, or both. To a TTI pattern, there may be associated, or be assigned (e.g., such that the TTI patterns comprises), a reference signaling pattern (RS pattern), and/or a control channel pattern. A RS pattern may for example comprise a CSI-RS pattern and/or CRS pattern, for example in or for DL, and/or a SRS pattern, e.g. in or for uplink. A control channel pattern may pertain to one or more physical control channels, e.g. for example PDCCH and/or PUCCH.

A pattern, like TTI pattern, or a reference signaling pattern (of a TTI pattern) may define the resource distribution, in particular in time/frequency and/or power, used for TTI pattern, or the reference signaling respectively its transmission. A pattern may be defined in regard to, and/or comprise or indicate, a density (of symbols or signaling) in time and/or frequency, e.g. in terms of how may REs and/or symbols are transmitted in a given time interval like a TTI or subframe or slot, and/or on a carrier or frequency range, in particular pertaining to the number of subcarrier used for RS transmission. Generally, to different beamforming states and/or different beam reception states, there may be associated different patterns.

Figure 5:
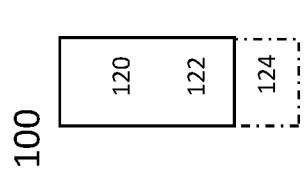
FIG. 5, showing an exemplary network node.

FIG. 5 schematically show a network node or base station 100, which in particular may be an eNodeB. Network node 100 comprises control circuitry 120, which may comprise a controller connected to a memory. Any module, e.g. receiving module and/or transmitting module and/or control or processing module, of the network node may be implemented in and/or executable by the control circuitry 120. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. The antenna circuitry may be connected to and/or comprise an antenna array.

Figure 6:
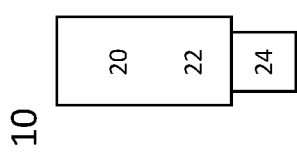
FIG. 6, showing an exemplary terminal.

FIG. 6 schematically shows a terminal 10, which may be implemented in this example as a user equipment. Terminal 10 comprises control circuitry 20, which may comprise a controller connected to a memory. Any module of the terminal, e.g. receiving module and/or transmitting module and/or control or processing module, may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry.

Alternatively, or additionally, there may be considered generally the following:

It is discussed how different TTIs can be supported in LTE and what the implications on HARQ and grant timing are.

1.1 DL Subframes

Short TTI in a subframe for two different (sTTI) lengths is described: 2os (OFDMA-symbol time length) and 7os. To simplify the definition of UL grant timing and DL HARQ timing, it is proposed that the DL TTIs have fixed starting positions and that the length of the first DL TTI, and in some cases the number of DL TTIs, varies depending on the number of symbols used for PDCCH, see FIG. 7. Since the longest PDCCH length of 4 OFDM symbols is intended for narrowband operation, it is proposed not to be used for short TTI operation, since the control overhead may become too large.

When defining the positions of a 2-symbol DL sTTI within the subframe, the CSI-RS pattern should be considered so that a CSI-RS pair in time domain does not overlap two consecutive DL TTIs but is contained in a single sTTI. This enables to combine the sTTI feature with CSI-RS based transmission modes, especially to obtain accurate interference measurement with CSI-IM.

Figure 7:
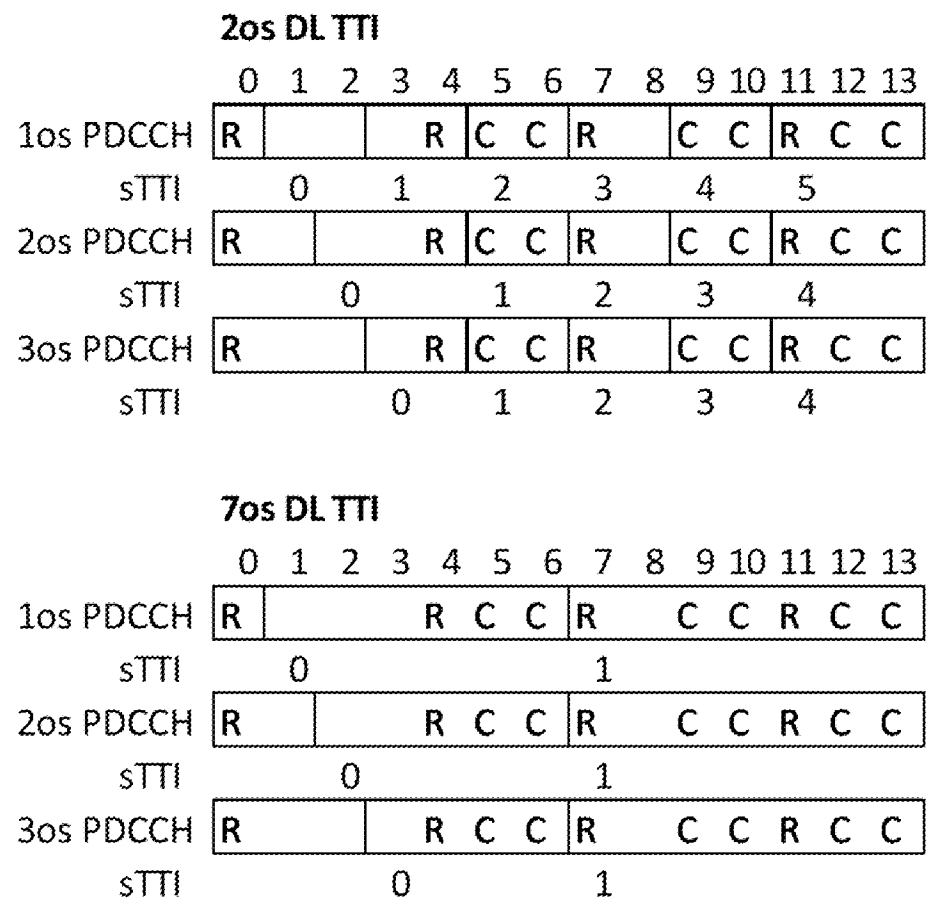

FIG. 7 shows TTIs in DL subframe for different TTI lengths and PDCCH lengths. R and C denote a OFDM symbol with CRS and potential CSI-RS, respectively.

Proposal 1 Aim at that a DL TTI length corresponds to fixed starting symbols of TTIs in PDSCH Proposal 2 PDCCH length of 4 should not be supported for short TTI operation.

Proposal 3 sTTI position is designed so that it does not partly overlap with potential CSI-RS resources The timing for transmitting DL HARQ in UL needs to be well defined, it may be indicated to the UE separately from the DL assignment. To keep the payload of each sPUCCH low, the DL HARQ should be distributed over the UL subframe, which may depend on the length of sPUCCH. Also, multiplexing capabilities should be considered. A fixed mapping from DL TTI to sPUCCH for a certain DL TTI and sPUCCH combination is proposed.

Proposal 4 The DL HARQ timing is fixed for a combination of DL and UL TTI for sPUCCH.

1.2 UL Subframes 1.2.1 sPUSCH

Figure 8:
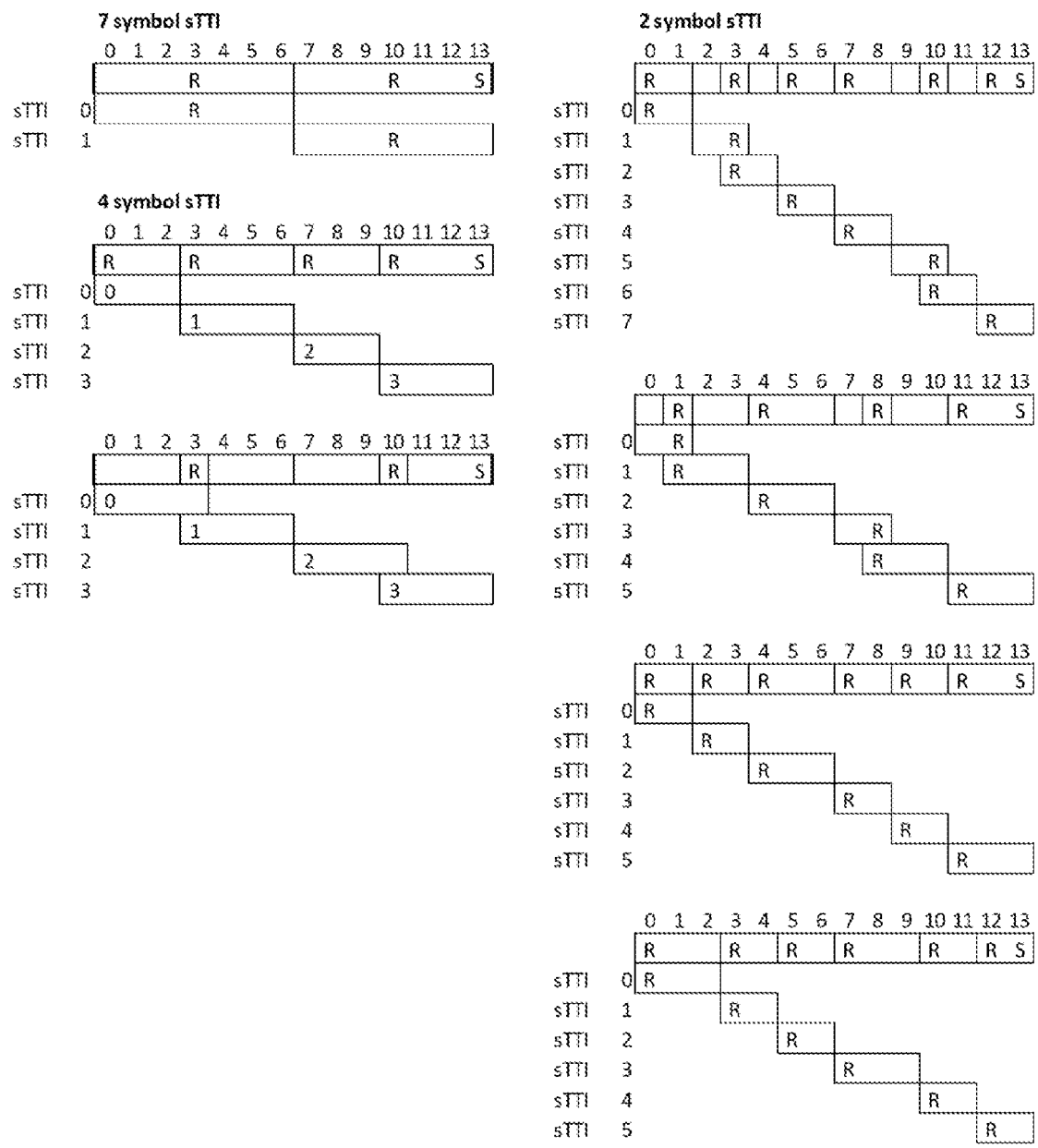
FIG. 8, showing additional exemplary TTI configurations.

For sPUSCH a certain TTI length may correspond to different TTI configurations depending on if the DMRS are shared or not. In FIG. 8, examples for TTI lengths of 2, 4, and 7os with and without SRS in the last symbol are given. For a given configuration the TTIs have fixed starting positions, and are placed such that the TTIs do not cross the slot-border. This way, slot-based frequency hopping is possible.

FIG. 8 shows TTIs for sPUSCH in UL subframe for one realization of the different options of TTI lengths, where R denotes reference symbol and S SRS position (if scheduled).

Observation 1 . . . Different UL TTI configurations can be defined for an UL TTI length.

Proposal 5 . . . Aim at that an UL TTI configuration corresponds to fixed starting symbols of TTIs in PUSCH.

Proposal 6 . . . Uplink sTTI transmission is not mapped across slot-boundary.

Proposal 7 . . . It is recommended to support 2/3 symbols sPUSCH for lowest latency, and 4 and 7 symbols sPUSCH for reduced latency with higher TBS.

The UL grant for the UL sTTI should be transmitted in the sPDCCH inside the DL sTTI. The number of TTIs in DL can be fewer in some configurations. For example, only 5 DL TTIs are included within one sub-frame, see FIG. 7, for an sPDCCH of 3 symbols and DL TTIs of 2 symbols. According to FIG. 2, up to 8 TTIs in an UL sub-frame may be provided. A possibility to send at least 2 UL grants within one DL sTTI may be considered. Each UL grant should then specify which of two possible UL TTIs that is granted, if not implicit from location.

Proposal 8 The time from UL grant to sPUSCH transmission is based on a combination of sPDCCH timing and configuration in UL grant.

1.2.2 Spucch

The pattern of sPUCCH TTI may differ from that of sPUSCH. For the shortest DL TTI of 2 symbols, the sPUCCH should be equally long as the DL TTI to provide the shortest delay and to avoid multiplexing or bundling HARQ. This also allows for a simple 1-1 mapping between a DL TTI and the sPUCCH in which HARQ feedback is transmitted. More than 6 sPUCCH per subframe is not required since this corresponds to the maximum number of DL sTTI in a subframe. The sPUCCH should, if possible, be aligned to the sPUSCH of FIG. 2. This is to avoid overlapping transmissions from a UE. Different patterns may be used if the subframe contains SRS.

Figure 9:
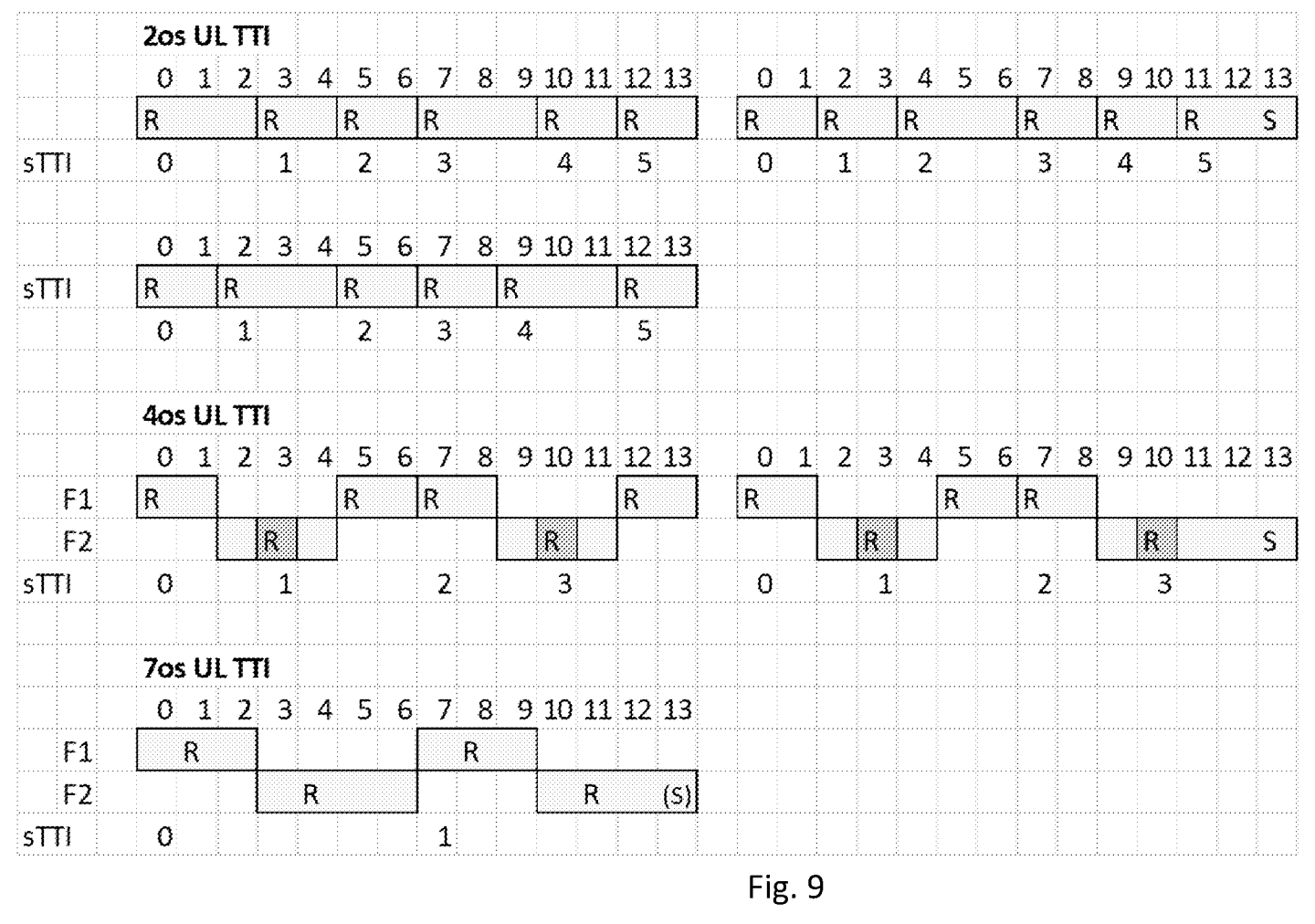

FIG. 9 shows TTIs for sPUCCH of different length. For 4os and 7os TTI frequency hopping between F1 and F2 is possible. S denotes symbol with SRS, and orange denotes symbol shared between users.

Two sPUCCH concepts may refer to a short and a long sPUCCH. In addition to the shorter sPUCCH solution described above, a longer sPUCCH may be provided for improved coverage. For TDD operation, and for CA support, also higher payloads may be provided. A 7 symbol sPUCCH based on PF3 or PF4 would fulfill the requirements on improved coverage and increased payload, and also provide sufficiently low latency.

Also a 4 symbol sPUCCH should be specified if a 4 symbol sPUSCH is specified, since it is much easier if the TTI of PUSCH and PUCCH is the same, as discussed below.

Proposal 9 . . . Define sPUCCH of 2/3 symbols TTI, to support SR and HARQ-ACK, and sPUCCH of 4 and 7 symbols for improved coverage and increased payload.

1.3 TTI Length Combinations

It should be possible to combine the TTI lengths in DL and UL as described above. For overhead and payload reasons it may make sense to use a longer TTI for UL data if latency needs are less strict, and for coverage reasons a longer sPUCCH may be important. However, it is reasonable to limit the combinations so that scheduling and feedback do not become overly complex.

Proposal 10 . . . Specify the allowed combinations of a DL TTI length and the allowed UL TTI length If the UL TTI is shorter than the DL TTI, multiple UL grants may be needed in one DL TTI. For coverage reasons the sPUCCH TTI should only be as short as the DL TTI, or longer. Thus, it is proposed that the UL TTI lengths (sPUSCH and sPUCCH) are the same or longer than the DL TTI.

Proposal 11 . . . UL TTI length for sPUSCH and sPUCCH can be equal or longer than DL TTI length.

The sPUCCH TTI length could in principle be set independently of the PUSCH TTI length, since the period of sPUCCH is more connected to DL TTI, as payload and timing should be properly set. However, to facilitate the UCI mapping on sPUSCH and ensure sufficient UCI performance on sPUSCH, the TTI length of sPUSCH should be the same or longer than the one of sPUCCH. In general, if a 7-symbol sPUCCH was configured by eNB for a given UE due to coverage issue or high sPUCCH payload, it is very likely that a 7-symbol sPUSCH is also preferable for the same reasons. Also the start of the sPUCCH and sPUSCH should be aligned, or a rule is needed to move UCI to sPUSCH when they overlap.

Proposal 12 . . . TTI length for sPUSCH and sPUCCH are equal, and the start of TTIs are aligned.

With the TTI lengths discussed above the most relevant TTI combinations to consider are those listed in Table 1. Case 1 also increases scheduling complexity but may be required for improved sPUCCH coverage.

Proposal 13 Four combinations of TTI lengths should be available for short TTI operation:
  sPDSCH/sPUSCH/sPUCCH lengths 2/2/2, 2/4/4, 2/7/7, and 7/7/7 symbols.

TABLE 1

Relevant short TTI combinations to consider.

| Case | SPDSCH/ sPDCCH TTI | sPUSCH TTI | SPUCCH TTI | Use case |
| --- | --- | --- | --- | --- |
| 0 | 2os | 2os | 2os | Lowest latency |
| 1 | 2os | 4os | 4os | Lowest DL latency, low UL latency |
| 2 | 2os | 7os | 7os | Lowest DL latency with improved UL coverage and reduced UL latency |
| 3 | 7os | 7os | 7os | Reduced latency |

1.3.1 Switching Between sTTI Cases

It should be possible to change sTTI case (as described above) between subframes, and also to move individual users from one case to another. As an example, it may be considered all users starting in sTTI case 0. This can be indicated over RRC, or in PDCCH as lowest latency normal operation. A user who loses UL coverage is then identified by the network and is moved to case 1 or 2 (indicated e.g. with fast DCI or RRC). By the use of split allocations, it is possible to serve users with different TTI lengths in the same sTTI band. It should be noted that when moving users from one case to another, the delay before the changed UL sTTI length is valid needs to be defined.

Proposal 14 It should be possible to individually move users between sTTI cases.

Proposal 15 It should be possible to run different cases simultaneously in UL and DL.

The following observation is discussed:
Observation 1 . . . Different UL TTI configurations can be defined for an UL TTI length.

Based on the discussion, the following proposals may be considered:

Proposal 1 . . . Aim at that a DL TTI length corresponds to fixed starting symbols of TTIs in PDSCH Proposal 2 . . . PDCCH length of 4 should not be supported for short TTI operation.

Proposal 3 sTTI position is designed so that it does not partly overlap with potential CSI-RS resources Proposal 4 The DL HARQ timing is fixed for a combination of DL and UL TTI for sPUCCH.

Proposal 5 Aim at that an UL TTI configuration corresponds to fixed starting symbols of TTIs in PUSCH.

Proposal 6 . . . Uplink sTTI transmission is not mapped across slot-boundary.

Proposal 7 . . . It is recommended to support 2/3 symbols sPUSCH for lowest latency, and 4 and 7 symbols sPUSCH for reduced latency with higher TBS.

Proposal 8 The time from UL grant to sPUSCH transmission is based on a combination of sPDCCH timing and configuration in UL grant.

Proposal 9 . . . Define sPUCCH of 2/3 symbols TTI, to support SR and HARQ-ACK, and sPUCCH of 4 and 7 symbols for improved coverage and increased payload.

Proposal 10 Specify the allowed combinations of a DL TTI length in sub-frame "N" and the allowed TTI length in the UL subframe "N+D" in which DL HARQ is transmitted (corresponding to sub-frame "N") and in which the UL grants are valid (transmitted in sub-frame "N").

Proposal 11 . . . UL TTI length for sPUSCH and sPUCCH can be equal or longer than DL TTI length.

Proposal 12 TTI length for sPUSCH and sPUCCH are equal, and the start of TTIs are aligned.

Proposal 13 . . . Four combinations of TTI lengths should be available for short TTI operation: sPDSCH/sPUSCH/sPUCCH lengths 2/2/2, 2/4/4, 2/7/7, and 7/7/7 symbols.

Proposal 14 It should be possible to individually move users between sTTI cases.

Proposal 15 It should be possible to run different cases simultaneously in UL and DL.

These proposals may be considered to be independent from each other, such that they may be implemented individually, or in any suitable combination.

There may be considered a (first) network node adapted for DL transmitting according to one of the proposals for DL transmission described herein, in particular according to one of the DL patterns, in particular DL sTTI patterns, and/or TTI lengths described herein, and/or according to one or any combination of the conditions discussed herein. Transmitting may be based on, and/or the network node may be adapted for, determining a pattern to be used. The network node may be adapted for, and/or comprise a switching module for, switching between different patterns. Such switching may occur e.g. between subframes. The network node may generally comprise a transmitting module for DL transmitting, and/or a determining module for determining a pattern. Determining the pattern may be based on operation conditions, in particular on latency requirements. Transmitting may generally pertain to wireless or radio transmissions.

Alternatively, there may be considered a (second) network node adapted for configuring a terminal like a UE with a TTI configuration for DL communication (reception) and/or UL transmission according to one or more DL TTI patterns and/or UL TTI patterns and/or any one, or any combination of, the conditions described herein. The network node may comprise a corresponding configuring module. The network node may also be adapted as a (first) network node described above.

Any of the network node/s may be a network node for a wireless communication network.

Moreover, there may be considered a (first) method of operating a network node in a wireless communication network, e.g. of operating a (first) network node as described herein. The method may comprise DL transmitting according to one of the proposals for DL transmission described herein, in particular according to one of the DL patterns, in particular DL sTTI patterns, and/or TTI lengths described herein, and/or according to one or any combination of the conditions discussed herein. Transmitting may be based on, and/or the method may comprise, determining a pattern to be used. The method optionally may comprise switching between different patterns. Such switching may occur e.g. between subframes. Determining the pattern may be based on operation conditions, in particular on latency requirements.

Alternatively, there may be considered a (second) method of operating a network node in a wireless communication network, which may be a (second) network node described herein. This method may comprise configuring a terminal like a UE with a TTI configuration for DL communication (reception) and/or UL transmission according to one or more DL TTI patterns and/or UL TTI patterns and/or any one or any combination of conditions described herein. The method may also comprise actions and/or the actions of the (first) method for operating a network node described above.

Generally, there may be considered a terminal for a wireless communication network. The terminal may be implemented as a UE. The terminal may be adapted for receiving and/or transmitting according to a TTI configuration.

Also, there is disclosed a method of operating a terminal in a wireless communication network. The terminal may be implemented as a UE. The method comprises receiving and/or transmitting according to a TTI configuration. The method may comprise receiving the TTI configuration, e.g. from a network node, which may be a (second) network node as described herein.

A TTI configuration may generally pertain to DL communication (reception) and/or UL transmission according to one or more DL TTI patterns and/or one or more UL TTI patterns and/or any one, or any combination of, the conditions described herein. The terminal may comprise a receiving module for receiving the configuration, e.g. from a network node, which may be a (second) network node as described herein. A TTI configuration may define and/or pertain to a slot and/or a subframe. A configuration may generally be valid over a plurality of slots and/or subframes.

There may be considered a wireless transmitter and/or network node adapted for performing any one of the methods for operating a wireless transmitter and/or network node described herein.

There may be considered a terminal adapted for performing any one of the methods for operating a terminal described herein.

There is also disclosed a program product comprising code executable by control circuitry, the code causing the control circuitry to carry out and/or control any one of the method for operating a terminal or network node as described herein, in particular if executed on control circuitry, which may be control circuitry of a terminal or a network node as described herein.

Moreover, there is disclosed a carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Reference signaling may comprise one or more reference signals or symbols. Reference signals may be adapted or intended for a receiver (e.g., a terminal) to perform measurements on and/or to provide a measurement report on. Reference signals may be defined by a standard, e.g. CSI-RS defined by LTE. Measurement reporting and/or providing a measurement report may generally comprise transmitting a measurement report, in particular to a source/transmitter of reference signaling, e.g. a transmitting node or network node, and/or performing measurements, e.g. on reference signaling, and/or evaluating measurements (e.g., processing the measurement results).

A measurement report may be based on the performed measurements and/or the evaluating. Generally, reference signaling may be cell-specific or receiver-specific. CSI-RS may be considered an example for receiver-specific reference signaling. Receiver-specific reference signaling may be intended for a specific receiver to perform measurements on, the receiver may be configured accordingly. Cell-specific reference signaling may be intended for all (or at least an unspecified number of) receivers in the cell to perform measurements on. Transmitting a reference signaling on more than one antenna element may comprise beamforming (e.g., of the reference signaling). Transmitting different reference signalings (e.g., a first and a second reference signaling), and/or on different antenna elements (for the same and/or different reference signaling) may be performed simultaneously, e.g. in the same time interval (e.g., symbol time interval, which may associated to a subframe), and/or such that symbols or signals of one reference signaling coincide with symbols or signals of the other reference signaling. A symbol of a reference signal may cover and/or comprise and/or represent one Resource Element, and/or a symbol time interval and an associated frequency range, e.g. a subcarrier. Reference signaling may be represented by a pattern, e.g. in time/frequency space. The pattern may represent symbols and/or signals and/or resources (e.g., REs), respectively their distribution (in particular, in time/frequency and/or power) used for the reference signaling, in particular in a given time interval, e.g. a TTI and/or over a subframe of slot. Examples for reference signaling comprise in particular CSI-RS, but also CRS and SRS.

Configuring (e.g., with or for a configuration) a device like a terminal or network node may comprise bringing the device into a state in accordance with the configuration. A device may generally configure itself, e.g. by adapting a configuration. Configuring a terminal, e.g. by a network node, may comprise transmitting a configuration or configuration data indicating a configuration to the terminal, and/or instructing the terminal, e.g. via transmission of configuration data, to adapt the configuration configured.

A configuration may in particular pertain to measurement reporting, e.g. to a CSI process. Measurement reporting may generally pertain to specific signaling (or an associated port), which may be indicated or configured to the terminal by the network or network node, e.g. by transmitting corresponding configuration data. Measurement reporting may generally indicate a preferred port or port combination (or precoder or precoder combination) to be used, which may be referred to as port or precoder selection. In particular, a configuration may indicate the pattern determined for RS and/or used for RS transmission (e.g., by the network node), in particular CSI-RS.

A scheduling grant (e.g., uplink grant) may represent control signaling (e.g., downlink control information/signaling). It may be considered that a scheduling grant configures the signaling resource range and/or resources for uplink signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages. A scheduling grant or UL grant may be implemented as DCI transmission, e.g. on PDCCH (Physical Downlink Control Channel).

A scheduling assignment (e.g., DL assignment) may be configured with control signaling, e.g. downlink control signaling like DCI signaling. Such control signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink. A scheduling assignment may be signaled on a PDCCH.

Transmitting in downlink may pertain to transmission from the network or network node to the terminal. Transmitting in uplink may pertain to transmission from the terminal to the network or network node. Uplink and downlink may be considered communication directions.

A measurement process like a CSI process may generally comprise receiving (e.g., by a UE), from a transmitting node or network node, reference signaling (CSI-RS), and providing a report like measurement report based on the received reference signaling. The report or measurement report may in particular indicate or comprise CSI information, in particular CQI (Channel Quality Indicator), PMI (Precoding Matrix Indicator) and/or RI (Rank Indicator), and/or a beam selection report or indication indicating which beam is selected by the measuring device like a terminal.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header.

Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A wireless or cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Reference signaling in the uplink may be associated to a terminal, e.g. SRS.

A network node or base station may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device, e.g., receiver and/or transmitter and/or transceiver. Control circuitry (which may also be referred to as processing circuitry) may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled.

An eNodeB (eNB) may be envisioned as an example of a base station, e.g. according to an LTE standard. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for cellular communication between two nodes or terminals of a wireless communication network, in particular two user equipments.

An antenna array may comprise a plurality of antennas or antenna elements, which may be individually controllable and/or be controllable for beamforming. An antenna array may in particular comprise 128 or more, or 256 or more, or 512 or more antenna elements. An antenna array, and/or the network node and/or associated circuitry, may be adapted for Massive MIMO.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation or network node, may be adapted to determine and/or transmit corresponding allocation data indicating release or de-allocation of resources to one or more wireless devices, in particular to a first wireless device. Resources may be represented by resource blocks or resource elements (RE), the latter of which may represent a smallest allocatable block of time/frequency resource and/or a subcarrier in frequency space and a symbol time length in time, in particular for LTE.

A wireless communication network may generally be any network providing radio access for telecommunication. It may comprise a Radio Access Network (RAN), e.g. according to UMTS, LTE or a related standard, a Next Radio standard or generally a 4G or 5G standard. A network node may generally be any radio network node, e.g. of a RAN. For example, a network node may be a base station, eNodeB, macro node, micro node, relay node, etc. A terminal may be any device providing a possible termination point for telecommunication utilising the wireless communication network. The terminal may be adapted for communication with or via the network, in particular a network node of the network. A terminal may be implemented as a user equipment (UE), or Machine-Type-Communication (MTC) device. It may be considered that a terminal is mobile, however, stationary terminals may be envisioned. A terminal may in particular be a smartphone, mobile phone, tablet, laptop, desktop computer, sensor arrangement or a machine adapted e.g. for MTC.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise:
Abbreviation Explanation
BLER Block Error Rate
CRS Cell-specific or Common RS
DCI Downlink Control Information
ePDCCH enhanced Physical Downlink Control Channel
LTE Long Term Evolution
MAC Medium Access Control
MCS Modulation and Coding Scheme
OFDM Orthogonal Frequency Division Multiple Access
PDCCH Physical Downlink Control Channel
PDSCH Physical Downlink Shared Channel
PRB Physical Resource Block
PUSCH Physical Uplink Shared Channel
RAT Radio Access Technology
RB Resource Block
RE Resource Element
RRC Radio Resource Control
RS Reference Signal(ing)
SC-FDMA Single Carrier-Frequency Division Multiple Access sPDCCH short Physical Downlink Control Channel
sPDSCH short Physical Downlink Shared Channel
sPUSCH short Physical Uplink Shared Channel
SF SubFrame
sTTI short TTI (shorter than a subframe/14 symbols)
SRS Sounding Reference Signal(ing)
TTI Transmission Time Interval
PDCCH Physical Downlink Control Channel
PUSCH Physical Uplink Shared Channel
PUCCH Physical Uplink Control Channel
DL Downlink; generally referring to transmission of data to a node/into a direction further away from network core (physically and/or logically); in particular from a base station or eNodeB to a D2D enabled node or UE; often uses specified spectrum/bandwidth different from UL (e.g. LTE)
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency These abbreviations may be used according to 3GPP and/or LTE practice, if applicable.

The invention claimed is:

1. A method in a terminal in a wireless communication network, the method comprising:
receiving, a Downlink Control Information, DCI, scheduling grant comprising a transmission time interval, TTI, configuration, wherein the DCI scheduling grant is received in a control region of a slot;
transmitting, signalling on a Physical Uplink Shared Channel, PUSCH, according to the TTI configuration, wherein the TTI configuration schedules a short TTI for PUSCH transmission in the slot in which the DCI scheduling grant is received, and wherein the short TTI for PUSCH transmission has a length between 1 to 7 symbols.

2. The method in a terminal according to claim 1, wherein the TTI configuration is received from a network node.

3. The method in a terminal according to claim 1, wherein the TTI configuration further schedules resources for Demodulation Reference Signalling reference, DMRS, signalling associated with the PUSCH transmission.

4. The method in a terminal according to claim 1, wherein the short TTI for PUSCH transmission has a length of 1 or 2 symbols.

5. A method in a network node in a wireless communication network, the method comprising:
transmitting, to a terminal, a Downlink Control Information, DCI, scheduling grant, in a control region of a slot, the DCI scheduling grant comprising a transmission time interval, TTI, configuration, for a Physical Uplink Shared Channel, PUSCH, transmission, wherein:
the TTI configuration schedules a short TTI for the PUSCH transmission in the slot in which the DCI scheduling grant is received,
the short TTI for PUSCH transmission has a length between 1 to 7 symbols; and
based on the TTI configuration, receiving signalling on a PUSCH from the terminal in the slot.

6. The method in a network node according to claim 5, wherein the TTI configuration further schedules resources for Demodulation Reference Signalling reference, DMRS, signalling associated with the PUSCH transmission.

7. The method in a network node according to claim 5, wherein the short TTI for PUSCH transmission has a length of 1 or 2 symbols.

8. A terminal for a wireless communication network, the terminal comprising:
processing circuitry configured to
receive, a Downlink Control Information, DCI, scheduling grant comprising a transmission time interval, TTI, configuration, wherein the DCI scheduling grant is received in a control region of a slot;
transmit, signalling on a Physical Uplink Shared Channel, PUSCH, according to the TTI configuration, and
wherein the TTI configuration schedules a short TTI for PUSCH transmission in the slot in which the DCI scheduling grant is received, and wherein the short TTI for PUSCH transmission has a length between 1 to 7 symbols.

9. The terminal according to claim 8, wherein the TTI configuration is received from a network node.

10. The terminal according to claim 8, wherein the TTI configuration further schedules resources for Demodulation Reference Signalling reference, DMRS, signalling associated with the PUSCH transmission.

11. The terminal according to claim 8, wherein the short TTI for PUSCH transmission has a length of 1 or 2 symbols.

12. A network node for a wireless communication network, the network node comprising:
processing circuitry configured to:
transmit, to a terminal, a Downlink Control Information, DCI, scheduling grant, in a control region of a slot, the DCI scheduling grant comprising a transmission time interval, TTI, configuration, for a Physical Uplink Shared Channel, PUSCH, transmission, wherein:
the TTI configuration schedules a short TTI for the PUSCH transmission in the slot in which the DCI scheduling grant is received,
the short TTI for PUSCH transmission has a length between 1 to 7 symbols; and
based on the TTI configuration, receive signalling on a PUSCH from the terminal in the slot.

13. The network node according to claim 12, wherein the TTI configuration further schedules resources for Demodulation Reference Signalling reference, DMRS, signalling associated with the PUSCH transmission.

14. The network node according to claim 12, wherein the short TTI for PUSCH transmission has a length of 1 or 2 symbols.

* * * * *